United States Patent [19]

Akao et al.

[11] Patent Number: 5,110,643
[45] Date of Patent: May 5, 1992

[54] PACKAGING MATERIAL FOR PHOTOSENSITIVE MATERIALS

[75] Inventors: Mutsuo Akao; Takuichi Komatsu, both of Kanagawa, Japan

[73] Assignee: Fuji Photo Film Co., Ltd., Minami-ashigara, Japan

[21] Appl. No.: 444,945

[22] Filed: Dec. 4, 1989

[51] Int. Cl.$^5$ .............................................. B29D 22/00
[52] U.S. Cl. .................................. 428/35.9; 428/35.8; 428/213; 428/481; 428/483; 428/910
[58] Field of Search ..................... 428/35.8, 35.9, 461, 428/211, 481, 483, 910, 213

[56] References Cited

U.S. PATENT DOCUMENTS

| | | |
|---|---|---|
| 4,147,291 | 4/1979 | Akao et al. . |
| 4,258,848 | 3/1981 | Akao et al. ........................ 206/524.2 |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. ........................... 428/201 |
| 4,386,124 | 5/1983 | Akao . |
| 4,411,943 | 10/1983 | Akao . |
| 4,411,945 | 10/1983 | Akao . |
| 4,436,809 | 3/1984 | Akao et al. . |
| 4,452,846 | 6/1984 | Akao . |
| 4,469,741 | 9/1984 | Akao . |
| 4,513,050 | 4/1985 | Akao . |
| 4,565,733 | 1/1986 | Akao . |
| 4,565,743 | 1/1986 | Akao . |
| 4,576,865 | 3/1986 | Akao . |
| 4,579,781 | 4/1986 | Akao . |
| 4,584,234 | 4/1986 | Hirose et al. . |
| 4,587,175 | 5/1986 | Akao . |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,708,896 | 11/1987 | Akao . |
| 4,730,778 | 3/1988 | Akao . |
| 4,778,712 | 10/1988 | Akao . |
| 4,778,713 | 10/1988 | Akao . |
| 4,784,906 | 11/1988 | Akao . |
| 4,787,506 | 11/1988 | Akao . |
| 4,796,823 | 1/1989 | Akao . |
| 4,844,961 | 7/1989 | Akao . |
| 4,871,613 | 10/1989 | Akao . |
| 4,876,125 | 10/1989 | Akao . |
| 4,876,129 | 10/1989 | Akao . |
| 4,888,237 | 12/1989 | Balloni ................................. 428/461 |
| 4,894,264 | 1/1990 | Akao . |
| 4,903,834 | 2/1990 | Akao . |
| 4,906,517 | 3/1990 | Akao . |
| 4,925,711 | 5/1990 | Akao . |

Primary Examiner—Edith Buffalow
Attorney, Agent, or Firm—Burns, Doane, Swecker & Mathis

[57] ABSTRACT

The packaging materials for photosensitive materials having particular coextruded multilayers and a flexible sheet.

According to the composition, the packaging material is excellent in curl resistance, in physical strength particularly tear strength or in tearability by hand. These packaging materials have various properties necessary for packaging photosensitive materials, and are excellent in bag-making ability for automatic bag-making machine.

13 Claims, 7 Drawing Sheets

PACKAGING MATERIAL FOR PHOTOSENSITIVE MATERIALS

This application is a divisional, of application Ser. No. 147,318, filed Jan. 22, 1988.

BACKGROUND OF THE INVENTION

1. Field of the Invention

This invention relates to a packaging material for photosensitive materials such as photographic photosensitive materials.

2. Description of the Prior Art

As the packaging material for photographic photosensitive materials, it is necessary that various properties be present such as light-shielding, moistureproofness, gas barrier and physical strength, and various packaging materials have accordingly been developed.

Among them, there are the packaging films consisting of a flexible sheet and a thermoplastic resin film containing a light-shielding material laminated on one side of the flexible sheet. The flexible sheet is a metal foil or an aluminum-metallized film such as aluminum-metallized nylon resin film, aluminum-metallized polyester resin film, aluminum-metallized polyethylene resin film, aluminum-metallized polypropylene resin film or the like, and the thermoplastic resin film is high pressure low density polyethylene (LDPE) resin film, linear low density polyethylene (L-LDPE) or the like. These packaging films exhibit a strong tendency to curl, and bag-making is difficult.

In an attempt to counteract the curling tendency another flexible sheet was laminated on the other side of the flexible sheet so as to decrease curling. The another flexible sheet laminated was heat-resistant, and it was paper, nonwoven fabric or various thermoplastic resin films, such as nylon resin film, polyester resin film, high density polyethylene resin film or polypropylene resin film, being biaxially stretched, uniaxially stretched or unstretched and containing or not containing a light-shielding material. In order to decrease curling, the another flexible sheet to be laminated a similar composition and a similar thickness and contained a light-shielding material. Examples of such conventional packaging films are illustrated in FIG. 18 to FIG. 21.

The packaging film of FIG. 18 consists of a light-shielding LDPE resin film layer 10a, an aluminum foil layer 11 laminated thereon through an adhesive layer 5 and a bleached kraft paper flexible sheet layer 1 laminated thereon through an adhesive layer 5.

The packaging film of FIG. 19 consists of the packaging film illustrated in FIG. 18 and another light-shielding LDPE resin film layer 10a laminated on the flexible sheet layer 1 through an adhesive layer 5. This packaging film was employed for packaging the photographic photosensitive material requiring strong physical strength such as a weight roll of a photographic photosensitive material.

The packaging film of FIG. 20 consists of an aluminum foil layer 11 and two uniaxially stretched light-shielding film layers 12a laminated on both sides of the aluminum foil layer each through an adhesive layer 5 (U.S. Pat. No. 4,331,725).

The packaging film of FIG. 21 consists of a metallized thermoplastic resin film layer 16 composed of a thermoplastic resin film layer 14 and a metallic membrane layer 13 and two light-shielding polyethylene polymer layers 15a containing more than 50 wt. % of L-LDPE resin and a light-shielding material laminated on both sides of the metallized thermoplastic resin film layer 16 each through an adhesive layer 5. The strength and the difference in the layer thickness of both polyethylene polymer layers 15a were specified (Japanese Patent KOKAI No. 61-54934).

However, the packaging film of FIG. 18 was insufficient in the removal of curling, and it required special bag-making conditions. It was expensive, and packaging workability was poor. While, in the cases of the packaging materials of FIG. 19, FIG. 20 and FIG. 21, curling was improved, and bag-making was good. However, they were thick and stiff, and packaging workability was poor. They were also expensive. Moreover, when carbon black was blended as the light-shielding material, since the surface layer contained carbon black, their commercial values were low. Furthermore, since the exposed surface layer was almost the same as the reverse surface layer, heat resistance of the exposed surface layer was insufficient. As a result, heat-sealed portions of the surface layer melted not only to make its appearance poor but also decreased the physical strength of the heat-sealed portion. Additionally, the surface tended to be worn away during transportation, and the black powder generated stained the packaged or other products.

As the conventional packaging material for packaging heavy photographic photosensitive materials having sharp edges such as a roll film for movie, the packaging materials shown in FIG. 18 to FIG. 20 and FIG. 32 were employed.

The packaging material of FIG. 32 consists of a foamed sheet 26 and two uniaxially stretched light-shielding film layers 12a laminated on both sides of the foamed sheet each through an adhesive layer 5 (U.S. Pat. No. 4,565,733).

However, as the packaging material for packaging heavy photographic photosensitive materials having sharp edges, the packaging material of FIG. 18 was weak in physical strength. The packaging material of FIG. 19 was punctured by the sharp edge of a photographic photosensitive material. The inside surface layer was abraded to generate black powder, and it adhered on to the photographic photosensitive material. This caused developing troubles. The packaging material of FIG. 20 was remarkably improved in tear strength. However, since this packaging material was poor in buffer action, it was sometimes punctured by the sharp edge. It had also problems in heat-sealing strength and heat sealability. The packaging material of FIG. 32 was excellent in physical strength such as tear strength. However, it had a problem in bag-making, and bag-making ability in an automatic bag-making machine was particularly poor. Moreover, cutting waste of the uniaxially stretched film was generated in quantity, and it became expensive.

Some packaging materials are required tearability by hand. Uniaxially stretched film was usually employed for the packaging materials. The inventor has once prepared a packaging material consisting of a laterally uniaxially stretched high density polyethylene film layer, an aluminum foil layer laminated thereon through an adhesive layer and a light-shielding LDPE resin film layer containing carbon black further laminated thereon through an adhesive layer. The tearability of this packaging material was good. However, it was punctured at its corners during packaging or transportation, and therefore, moistureproofness and light-shielding could not been secured. The tearability of the aforementioned packaging materials such as shown in FIG. 19 was bad, and scissors were necessary for opening the package. In the case where scissors could not be used, the removal portion for photosensitive materials was partially sealed by dotted line seal, and in order to secure light-shielding and moistureproofness, the removal portion was turned and fixed by an adhesive tape. In the case of assembly packaging, since the folded portion contacted the packaged photosensitive materials, indentations or fogging by impression occurred. The packages became voluminous due to the folded portion so as to raise transportation cost and corrugated board cost. The compressive strength and dropping strength of the packaging bag became lower, and therefore, the packaging material of FIG. 19 was only used for gusset bags.

SUMMARY OF THE INVENTION

An object of the invention is to provide a packaging material for photosensitive materials in which curling hardly occurs and which is excellent in bag-making.

Another object of the invention is to provide a packaging material for photosensitive materials excellent in packaging workability.

Another object of the invention is to provide a packaging material for photosensitive materials in which the exposed surface layer is excellent in heat resistance and does not melt at heat-sealed portions.

Another object of the invention is to provide a packaging material for photosensitive materials excellent in wear resistance and black powder is not generated even during transportation.

Another object of the invention is to provide a packaging material suitable for heavy photographic photosensitive materials having sharp edges which is not punctured by the sharp edges.

Another object of the invention is to provide a packaging material suitable for heavy photographic photosensitive materials having sharp edges which is excellent in physical strength including tear strength, heat sealing strength and heat sealability.

Another object of the invention is to provide a packaging material suitable for heavy photographic photosensitive materials having sharp edges which is excellent in wear resistance and black powder is not generated even during transportation.

Another object of the invention is to provide a packaging material suitable for heavy photographic photosensitive materials having sharp edges which is excellent in bag-making ability.

Another object of the invention is to provide a packaging material tearable by hand while not punctured through packaging and transportation and capable of securing moistureproofness and light-shielding.

Another object of the invention is to provide a packaging material tearable by hand which is excellent in physical strength and heat sealability.

A further object of the invention is to provide a packaging material which is inexpensive.

These objects have been achieved by coextruded multilayer film layer and a flexible sheet. Thus, the present invention provides:

A packaging material for photosensitive materials comprising a coextruded multilayer film layer comprising a light-shielding ethylene copolymer resin film layer containing a light-shielding material and a high Young's modulus thermoplastic resin film layer having a Young's modulus of more than 40 kg/mm$^2$ and a hygroscopicity of less than the light-shielding ethylene copolymer resin film layer, and a flexible sheet layer laminated on the side of the high Young's modulus thermoplastic resin film layer.

Another packaging material for photosensitive materials comprises a coextruded multilayer film layer having a Young's modulus in the longitudinal direction of more than 40 kg/mm$^2$ comprising a polyolefin resin film layer having a density of 0.941 to 0.970 g/cm$^3$, a melt index of 0.1 to 5 g/10 minutes and a Young's modulus in the longitudinal direction of more than 50 kg/mm$^2$ and a ethylene copolymer resin film layer having a density of 0.870 to 0.939 g/cm$^3$ and a melt index of 0.1 to 15 g/10 minutes, a metallized flexible sheet layer laminated on said coextruded multilayer film layer, and a flexible sheet layer laminated on said metallized flexible sheet layer, and said polyolefin resin film layer is located on the side of a packaged product, and, Another packaging material comprises a coextruded multilayer film layer comprising a high density high crystallinity polyethylene resin film layer having a melt index of 0.2 to 4 g/10 minutes and a density of more than 0.941 g/cm$^3$ and a ethylene copolymer resin film layer having a melt index of higher than said polyethylene resin film layer and a density of lower than said polyethylene resin film layer, and a biaxially stretched thermoplastic resin film layer having a thickness of 7 to 60 μm laminated on said coextruded multilayer film layer.

DETAILED DESCRIPTION OF THE INVENTION

Figure 1:
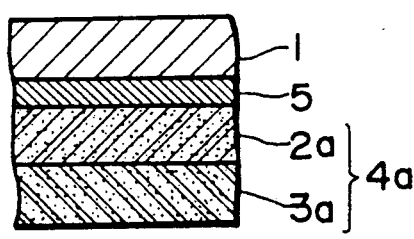
FIGS. 1 to 6 are sectional views of preferred embodiments of the invention which solve the problem of curling.

The light-shielding ethylene copolymer resin film layer is composed of a resin containing an ethylene copolymer resin. Preferable ethylene copolymer resins are linear low density polyethylene (L-LDPE) resin, ethylene-vinyl acetate copolymer (EVA) resin, ethylene-ethyl acrylate copolymer (EEA) resin, ethylene-methyl acrylate copolymer (EMA) resin and ethylene-acrylic acid copolymer (EAA) resin, and a particularly preferable resin is L-LDPE resin.

L-LDPE resin is a copolymer of ethylene and α-olefin such as butene-1, hexene-1, 4-methylpentene-1, heptene-1 or octene-1, and the content of α-olefin is about 0.5 to 15 mol. %. The density of L-LDPE resin is usually low or medium density and in the range of 0.87 to 0.95 g/cm$^3$. Examples of commercial L-LDPE resin are "UNIPOLE" (trade name, UCC), "DOWLEX" (trade name, Dow Chemical Co., Ltd.), "STAMILEX" (trade name, DSM), "SUCLEAR" (trade name, dupont de Nemour, Canada), "MARLEX" (trade name, Phillips Co., Ltd.), "ULTZEX" and "NEOZEX" (trade name, Mitsui Petroleum Chemical Industries Co., Ltd.), "NISSEKI LINIREX" (trade name, Nippon Petrochemicals Co., Ltd.). In view of physical strength and heat sealing strength, a preferred L-LDPE resin has an ethylene content of 90 to 99.5 mol. %, an α-olefin content of 10 to 0.5 mol. %, a melt index (MI) of 0.8 to 30 g/10 minutes (ASTM D-1238) and a density of 0.870 to 0.940 g/cm$^3$ (ASTM D-1505), the number of carbon atom of α-olefin is 6 to 8, and it is produced by the liquid phase method.

The content of ethylene copolymer resin is 10 to 100 wt. %, preferably 50 to 99 wt. %.

The light-shielding ethylene copolymer resin film layer contains a light-shielding material. The light-shielding material includes every material capable of shielding visible and ultraviolet lights. Examples of the light-shielding material are various carbon blacks, graphite, iron oxide, zinc white, titanium oxide, clay, aluminum powder, aluminum paste, calcium carbonate, mica, barium sulfate, talc, cadmium pigments, chrome yellow, red iron oxide, cobalt blue, copper phthalocyanine pigments, monoazo and polyazo pigments, aniline black and various metal fibers. Various carbon black, aluminum powder and aluminum paste from which volatile components are preferable. The form of the light-shielding material prior to blending may be powder, paste, wet state, masterbatch, pellets, etc.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic characteristics, they are also preferable, though they are expensive. They may be blended to the oil furnace black in order to improve its character. Suitable pH of carbon black is at 5 to 9, and suitable mean particle size is less than 200 mu, particularly 10 to 50 mμ. Particularly, the oil furnace carbon black having pH 6 to 8 and mean particle size of 15 to 30 mμ is preferable. By using the carbon black of such pH and particle size, a packaging material having the following merits is obtained. That is, the occurrence of fogging is rare, the increase or decrease of photosensitivity rarely happens, light-shielding ability is large, and the lumps of carbon black and pinholes such as fish eyes are hardly generated.

As the method of blending a light-shielding material, the masterbatch method is preferable in terms of cost and process.

The mean particle size of the carbon black is less than 200 mμ. When the mean particle size is beyond 200 mμ, the physical strength such as tear strength of coextruded film lowers.

The thickness of the light-shielding ethylene copolymer resin layer is generally in the range of 10 to 140 μm, preferably 20 to 70 μm.

The high Young's modulus thermoplastic resin film layer is composed of polyolefin resin, polyester resin, polyamide resin or the like. Suitable resins are L-LDPE resin, having a density of more than 0.930 g/cm$^3$, high density polyethylene (HDPE) resin, polypropylene (PP) resin and polyamide resin.

The Young's modulus of the high Young's modulus thermoplastic resin film layer is more than 40 kg/mm$^2$. When the Young's modulus is less than 40 kg/mm$^2$, the coextruded multilayer film is extended at the time of laminating a flexible sheet layer by stretching force. After the lamination, the stretching force vanishes, and the laminated film sharply curls by the shrinkage of the coextruded multilayer film layer.

The hygroscopicity of the high Young's modulus thermoplastic resin film layer is less than the light-shielding ethylene copolymer resin film layer, because the crystallinity of the high Young's modulus thermoplastic resin film layer is higher than the light-shielding ethylene copolymer resin film layer. When the content of the light-shielding material, such as carbon black, incorporated in the high Young's modulus thermoplastic resin film layer is less than the light-shielding ethylene copolymer resin film layer, the hygroscopicity further decreases according to the content of the light-shielding material.

The high Young's modulus thermoplastic resin film layer may contain a light-shielding material such as aluminum powder, carbon black or white pigment. Suitable content is 0.1 to 20 wt. %, and 1 to 6 wt. % is preferable.

The thickness of the high Young's modulus thermoplastic resin film layer is generally 10 to 140 μm, preferably 20 to 70 μm.

The thickness of the coextruded multilayer film layer is generally 30 to 200 μm, preferably 50 to 150 μm.

The flexible sheet layer is laminated on the side of the high Young's modulus thermoplastic resin film layer of the coextruded multilayer film layer. The flexible sheet capable of being laminated onto the coextruded film includes various thermoplastic resin films (which may be unstretched, uniaxially stretched or biaxially stretched) such as various polyethylene films, ethylene copolymer films, polypropylene films, polyvinyl chloride films, polyvinylidene chloride films, polyamide films, polycarbonate films, fluorocarbon polymer films, polyester films and their modified resin films. Other flexible sheets such as a metallized film such as aluminum-metallized film, cellulose acetate film, cellophane, polyvinyl alcohol film, paper, metal foil such as aluminum foil, nonwoven fabric, cross laminated porous fabric, perforated film, foamed polyethylene sheet, foamed polypropylene sheet, foamed polystyrene sheet and foamed polyurethane sheet are also suitable. Preferable flexible sheets are cellophane, cellulose acetate film, uniaxially or biaxially stretched thermoplastic resin film, processed films of these films such as coated with a moistureproofing or gas barrier layer such as vinylidene chloride layer or a metallized layer.

The thickness of the flexible sheet layer is usually 6 to 200 μm, preferably 10 to 100 μm. When the flexible sheet is a foamed sheet, its thickness may be up to several millimeters.

The packaging material suitable for heavy photographic photosensitive materials having sharp edges comprises a coextruded multilayer film layer comprising a polyolefin resin film layer and an ethylene copolymer resin film layer, a metallized flexible sheet layer and another flexible sheet layer.

The polyolefin resin film layer is preferably composed of more than 50 wt. % of HDPE resin in view of the improvement of physical properties. The improvement of film moldability and lowering cost. Representative resins blendable with HDPE resin are polyolefin resins. Examples of such a polyolefin resin include LDPE resin, medium density polyethylene (MDPE) resin, HDPE resin, L-LDPE resin, ethylene-propylene copolymer resin (random type or block type), ethylene-(butene-1) copolymer resin, propylene-(butene-1) copolymer resin, ethylene-propylene-(butene-1) copolymer resin, poly(butene-1) resin, polystyrene resin, poly(-methyl methacrylate) resin, styrene-acrylonitrile copolymer resin, ABS resin, PP resin, crystalline propylene-α-olefin copolymer resin, modified polypropylene resin, modified polyethylene resin, polypropylene-maleic anhydride graft copolymer resin, chlorinated polyolefin resin such as chlorinated polyethylene resin, chlorinated HDPE resin, chlorinated LDPE resin, chlorinated polyethylene copolymer resin and chlorinated atactic PP resin, EVA resin, ethylene ionomer resin (copolymer of ethylene and unsaturated acid crosslinked by metal ions), poly(4-methylpentene-1) resin, EAA resin, EMA resin, EEA resin, vinyl chloride-propylene copolymer resin, ethylene-vinyl alcohol copolymer resin, crosslinked polyethylene resin (electron ray irradiation crosslinking, chemical crosslinking, etc.), polyisobutylene resin, ethylene-vinyl chloride copolymer resin and poly(1,2-butadiene)resin.

The density of the polyolefin resin film layer is 0.941 to 0.970 g/cm$^3$. When the density is less than 0.941 g/cm$^3$, surface strength becomes insufficient because of low crystallinity. As a result, the surface is scraped off by the sharp edge of packaged products. While, when the density is beyond 0.970 g/cm$^3$, the crystallinity becomes too high. The molecules of the polyolefin resin film layer are oriented in longitudinal direction, and accordingly, this film is easily torn in the longitudinal direction. Film moldability and heat sealing properties are also degraded.

The MI of the polyolefin resin film layer is 0.1 to 5 g/10 minutes. When the MI is less than 0.1 g/10 minutes, film molding becomes difficult because of large molecular weight. While, when the MI is beyond 5 g/10 minutes, surface strength becomes insufficient. As a result, the surface is scraped by the sharp edges of packaged products.

The Young's modulus in longitudinal direction of the polyolefin resin film layer is more than 50 kg/mm$^2$. When the Young's modulus is less than 50 kg/mm$^2$, the surface is scraped by the sharp edges of packaged products. The surface is also worn away during transportation.

The thickness of the polyolefin resin film layer is generally 10 to 140 μm, preferably 20 to 70 μm.

The ethylene copolymer resin film layer is composed of an ethylene copolymer resin such as L-LDPE resin, EVA resin, EEA resin, EMA resin or EAA resin or a mixture thereof. A preferable resin is L-LDPE resin in view of tear strength and impact puncture strength.

The density of the ethylene copolymer resin film layer is 0.870 to 0.939 g/cm$^3$. When the density is less than 0.870 g/cm$^3$, bag-making ability becomes bad, and blockings occur. While, when the density is above 0.939 g/cm$^3$, the molecules of the ethylene copolymer resin film layer are oriented in the longitudinal direction. Accordingly, the tear strength in the longitudinal direction of the coextruded film becomes insufficient.

The MI of the ethylene copolymer resin film layer is 0.1 to 15 g/10 minutes. When the MI is less then 0.1 g/10 minutes, melt viscosity becomes too high. As a result, film moldability becomes bad, and melt fracture occurs. Film surface also becomes rough. While, when the MI is above 15 g/10 minutes, physical strength becomes insufficient. Film moldability also becomes bad.

The thickness of the ethylene copolymer resin film layer is generally 10 to 140 μm, preferably 20 to 70 μm.

The Young's modulus in the longitudinal direction of the coextruded multilayer film layer containing these layers is more than 40 kg/mm$^2$. When the Young's modulus is less than 40 kg/mm$^2$, the coextruded multilayer film is extended by stretching force at the time of laminating the metallized flexible sheet layer. Since the coextruded multilayer film shrinks after the lamination, the laminated film sharply curls. Besides, the surface strength becomes insufficient.

The coextruded multilayer film layer may be composed of three or more layers. The additional layer may be the polyolefin resin film layer, the ethylene copolymer resin film layer or other layers. However, the total thickness of the polyolefin resin film layer and the ethylene copolymer resin film layer should be more than 30% of the total thickness of the coextruded multilayer film layer.

The thickness of the coextruded multilayer film layer is generally 30 to 200 μm, preferably 50 to 150 μm.

The metallized flexible sheet layer is formed of a flexible sheet and a metallic membrane layer deposited on the flexible sheet.

As the flexible sheet, various thermoplastic resin films are usable, however, the films of uniaxially or biaxially oriented thermoplastic resins such as polyester resin, polyamide resin, polyethylene resin, polypropylene resin and polystyrene resin are preferable in view of physical strength and heat resistance.

The thickness of the flexible sheet is usually 6 to 200 μm, preferably 10 to 100 μm.

The metallic membrane layer may be formed of a pure metal such as Al, Sn, Zn, Co, Cr, Ni, Fe, Cu, etc., alloys thereof, or any other metals of which a metallic membrane layer can be made, but aluminum is the most preferable in terms of processing and cost. The thickness of the metallic membrane layer is 55 to 1200 Å. When the thickness is thinner than 55 Å, antistatic property, moistureproofness and light-shielding by this layer become insufficient. While, when the thickness is greater than 1200 Å, the degradation of the flexible sheet occurs by the heat of metallizing. The physical strength of the laminated film also decreases. In the case of an aluminum-metallized membrane, the preferable thickness is greater than 70 Å more preferably 80 to 800 Å, and still more preferably 100 to 600 Å. In the case of using a hygroscopic film such as polyamide film, the metallic membrane layer is preferably located on the side of another flexible sheet layer further laminated thereon.

Metallization is carried out according to a known method, such as vacuum evaporation, sputtering, ion plating, or electron beam heating. The metallic membrane layer may be formed on one face or both faces of the flexible sheet layer.

In order to improve adhesiveness of the metallic membrane layer to the flexible sheet, the flexible sheet layer may be provided with an anchor coat layer. The anchor coating agent may be conventional such as polyethyleneimine, polyisocyanate, polyurethane, alkyl titanate, polybutadiene, polyolefin, polyester, polyethylene, organic titanate or the like, and the anchor coat layer may be provided by applying the anchor coating agent by means of gravure roll coating, bar coating, dropping coating or the like. The surface of the flexible sheet may be treated by glow discharge, corona discharge, ultraviolet irradiation, ozone treatment, chemical reagent treatment, flame treatment, or the like.

A protective layer may be provided on the metallic membrane layer in order to protect the metallic membrane layer. As the resin for the protective layer, acrylic resins, cellulose resins such as cellulose acetate resin, urethane resins, epoxy resin, polyester resins, ionomer resins, EEA resins, various polyethylene resins and various polypropylene resins are usable. Wax, gelatin and polyvinyl alcohol are also usable. The thickness of the protective layer is made extremely thin such as thinner than 50 μm, preferably thinner than 5 μm, in order to eliminate stalic electricity effectively. Such a protective layer may be formed by a known solution coating or spray coating. A conductive material such as an antistatic agent, carbon black, a metal powder such as aluminum powder or aluminum paste or carbon fiber may be added to a flexible sheet, a light-shielding layer, an adhesive layer or the protection layer, and thereby, elimination of static electricity is assured.

Another flexible sheet layer laminated on the metallized flexible sheet layer may be selected from the aforementioned flexible sheets for laminating on the side of the high Young's modulus thermoplastic resin film layer of the coextruded multilayer film layer. Preferable flexible sheets as the packaging material for photographic photosensitive material are oriented thermoplastic resin films such as uniaxially or biaxially oriented, including stretched, polyester resin, polyamide resin, polypropylene resin, HDPE resin, L-LDPE resin, polystyrene resin, polyvinylidene chloride resin or the like, bleached kraft paper, synthetic pulp paper, synthetic paper, nonwoven fabric, neutral paper, dustfree paper, or the like, in view of adverse influence of harmful gas or contaminant upon the packaged photographic photosensitive materials, uniform quality, moistureproofness, printability, cost and the like. However, in the case that the influence of harmful gas or contaminant is not a problem, the flexible sheet may be unbleached kraft paper, semibleached kraft paper, Clupak paper, duostress paper, pure white roll paper, glassine paper, cellophane or the like.

The heat resistances of the above two flexible sheets are preferably higher than the polyolefin resin film layer, and for example, the melting point or softening point is preferably higher by 10° C. or more.

A light-shielding material is preferably incorporated into one or more layers of the packaging material. Suitable light-shielding materials are the same as the light-shielding materials mentioned previously. Suitable content is generally 0.5 to 50 g/m².

The packaging material tearable by hand comprises a coextruded multilayer film layer comprising a high density high crystallinity polyethylene resin film layer and an ethylene copolymer resin film layer and a biaxially stretched thermoplastic resin film layer.

The high density high crystallinity polyethylene resin film layer is composed of HDPE resin alone or a mixture of HDPE resin and another resin. Suitable resins for blending include polyolefin resins such as LDPE resin, L-LDPE resin, EVA resin, EEA resin, EMA resin, EAA resin and propyleneethylene copolymer resin, and among them, L-LDPE resin is preferable. Various α-olefins are employed for the copolymerization with ethylene, and the L-LDPE resin of ethylene and butene-1 is particularly preferably for blending. The L-LDPE resin is produced by vapor phase method, liquid phase method or modified high pressure method (ionic polymerization method). A preferable L-LDPE resin of which α-olefin is butene-1, is produced by vapor phase method (Unipole Process), and it has a MI of 0.1 to 10 g/10 minutes, a density of 0.87 to 0.935 g/cm³. The content of blended resin is generally less than 50 wt. %, preferably less than 30 wt. %.

The MI of the high density high crystallinity polyethylene resin film layer is 0.2 to 4 g/10 minutes, and its density is more than 0.941 g/cm³. When the MI is less than 0.2 g/10 minutes, film moldability is poor. Tear strength in longitudinal direction becomes too weak because of high molecular orientation. While, when the MI is beyond 4 g/10 minutes, tearability becomes insufficient because of poor molecular orientation. In the case that the density is less than 0.941 g/cm³, crystallinity becomes insufficient, and molecular orientation is poor.

The ethylene copolymer resin film layer is composed of an ethylene copolymer resin such as L-LDPE resin, EEA resin, EVA resin, EMA resin, EEA resin and propylene-ethylene block or random copolymer resin, and L-LDPE resin is preferable. A particularly preferable L-LDPE resin has a MI of 0.5 to 10 g/10 minutes and a density of 0.870 to 0.939 g/cm³, and α-olefin is 4-methylpentene-1, hexene-1 or octene-1. The MI of the ethylene copolymer resin film layer is higher than the high density high crystallinity polyethylene resin film layer, and the density is lower than that. By using the resin having a high MI, molding troubles such as melt fracture, lumps and furrows are solved, and the load on the extruding motor decreases. While, by using the low density resin, heat sealing properties and physical strength are improved.

The thickness of the coextruded multilayer film layer is generally 30 to 200 μm, and each layer is preferably more than 20% of the coextruded multilayer film layer.

The biaxially stretched thermoplastic resin film for laminating on the coextruded multilayer film layer is stretched 1.5 to 20 times, preferably 3 to 15 times both in longitudinal direction and in lateral direction by a known method such as simultaneous biaxial stretching or successive biaxial stretching. The resin composing this stretched film is polyester resin, polyamide resin, polyethylene resin, polystyrene resin, polypropylene resin, polyvinyl chloride resin, polyvinylidene chloride resin, polyvinyl acohol resin, binary or more copolymer resins of a monomer of the above resins and other monomers being random or block, and blended resins of the above resins and other resins. These resins are formed into films by T die extrusion, inflation process or the like.

The thickness of the biaxially stretched thermoplastic resin film is 7 to 60 μm. When the thickness is thinner than 7 μm, wrinkling or rupture are liable to occur. While, when the thickness is greater than 60 μm, the packaging material becomes too stiff, and bag-making ability and workability are poor.

The biaxially stretched thermoplastic resin film may be single layer film or coextruded multilayer film.

Moreover, the biaxially stretched film may be coated with another resin such as polyvinylidene chloride, silicone or teflon by application or printing or metallized with a metallic membrane layer. The metallic membrane layer may be the same as mentioned previously, and an anchor coat layer may be provided similarly. The surface of the biaxially stretched film may be activated by any of the aforementioned method, and a protective layer may also be provided as mentioned previously.

Any of the aforementioned layers of the packaging material tearable by hand may further be blended with a resin selected from the resins blendable with the HDPE resin of the polyolefin resin film layer of the packaging material suitable for weight photographic photosensitive materials having sharp edges other than polyethylene resins and particular ethylene copolymer resins, i.e. L-LDPE resins, EVA resin, EAA resin, EMA resin, and EEA resin.

When the packaging material is used for photosensitive materials, a light-shielding material is preferably incorporated into one or more layers of the packaging material so that optical density of the packaging material is more than 7. Suitable light-shielding materials are the same as the light-shielding materials mentioned previously. Suitable content is generally 0.5 to 50 g/m$^2$. The light-shielding material is preferably incorporated into the coextruded multilayer film layer.

The most preferable light-shielding material is carbon black described previously, and the second most preferable light-shielding material is metal powder. The metal powder is excellent in moistureproofness, light-shielding, antistatic property, prevention of temperature elevation under the sunlight, gas barrier and favorable appearance having a high commercial value.

As the metal powder, aluminum powder and its paste are preferable. The paste of aluminum powder is produced by adding mineral spirits and a small amount of a higher fatty acid such as stearic acid or oleic acid to form a paste at the production of aluminum powder according to a known method such as by using a ball mill, a stamp mill or an atomizer. A polyolefin thermoplastic resin such as various polypropylene resins, various polyethylene resins, EVA resin, EEAs resin and EAA resins is kneaded together with this aluminum paste while heating, and the volatile components mainly mineral spirits are removed by a vacuum pump. This product is used as aluminum paste compound resin or aluminum paste masterbatch resin.

The aluminum paste masterbatch resin is preferable because of eliminating noxious odors and adverse effects upon the photographic photosensitive materials by minimizing the content of mineral spirits in the coextruded film such as less than 0.1% by weight. For example, the masterbatch containing 40% by weight of aluminum paste and 1% by weight of mineral spirits is blended with the LDPE resin to form the coextruded multilayer film layer containing 2% by weight of aluminum paste. In this case, one part by weight of aluminum paste masterbatch is blended with 19 parts by weight of natural L-LDPE resin, and the mineral spirits content of the coextruded multilayer film layer becomes less than 0.05% by weight since a part of the mineral spirits evaporates during film formation.

The aluminum powder includes microflakes produced from aluminum foil which is crushed by a ball mill or a stamp mill, in addition to conventional aluminum powder manufactured by atomization, dropping on a rotary disc or evaporation from melted aluminum. Since aluminum powder is unstable, it is stabilized by a known treatment.

When the packaging material tearable by hand is used as a transparent packaging material, an antistatic agent or a conductive packaging material is preferably blended into one or more layers.

The packaging material tearable by hand may be laminated with a flexible sheet layer. The flexible sheet may be selected from the flexible sheets mentioned previously. Preferable flexible sheets are various papers having an areal weight of 20 to 400 g/m$^2$, such as unbleached kraft paper, semibleached kraft paper, bleached kraft paper, twisting paper, clupak paper, duostress paper, white board, photographic base paper, pure white roll paper, coated paper, simili and glassine paper, metal foils having a thickness of 5 to 50 μm, such as aluminum foil, tin foil, zinc foil, lead foil and iron foil, aluminum metallized papers and metallized films such as aluminum metallized thermoplastic resin films.

In the packaging material not curled, the packaging material suitable for heavy photographic photosensitive materials having sharp edges and the packaging material tearable by hand, the coextruded multilayer film may be formed by conventional coextrusion such as T die extrusion or inflation process.

In the packaging material, the flexible sheet layer, the metallized flexible sheet layer and other layers may be laminated according to an usual method such as heat sealing (hot bar sealing, flame melt adhesion, hot blast adhesion, impulse heat sealing, supersonic adhesion, etc.), the method using an adhesive (wet laminating, dry laminating, hot melt laminating extrusion laminating etc.) and coextrusion method.

Representative adhesives are thermoplastic resin melt adhesives including polyolefin adhesives, hot melt type gum adhesives and solution type adhesives. The polyolefin adhesives include homopolymers and copolymers of olefins such as various polyethylenes, polypropylenes, polybutenes, ethylene-propylene copolymers and L-LDPE, copolymers of an olefin and another monomer such as ethylene-vinyl acetate copolymer, ethylene-ethyl acrylate copolymer, ethylene-acrylic acid copolymer, various ionomers ("SURLYN" Dupont, "Himiran" Mitsui Polychemicals Co., Ltd., etc.) and graft copolymers. The solution type adhesives are divided into adhesives for wet lamination and adhesives for dry lamination. The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrile-butadiene rubber latex and chloroprene rubber latex. Examples of the adhesives for dry lamination are isocyanate adhesive and polyurethane adhesive. Adhesives for hot melt lamination where paraffin wax, microcrystalline wax, ethylene-vinyl acetate copolymer, ethylene-ethylacrylate copolymer and etc. are blended, pressure-sensitive adhesives, temperature-sensitive adhesives and ultraviolet rays-setting adhesive may also be employed. Melting point of the adhesive employed is preferably more than 5° C. less than the melting point of the layers to be joined in order to laminate without adverse effect upon the layer to be coated by thermal melting adhesion.

The thickness of the adhesive layer formed by extrusion laminating using a thermoplastic resin is usually 5 to 300 μm, preferably 13 to 70 μm in the case of the packaging material not curled, usually 8 to 50 μm, preferably 10 to 20 μm in the case of the packaging material suitable for weight photographic photosensitive materials having sharp edges, and usually 6 to 50 μm, preferably 10 to 20 μm in the case of the packaging material tearable by hand.

A lubricant is preferably blended into various layers of the packaging materials in order to improve film moldability, slipping character, processability and the like.

Examples of commercial lubricants suitable for the present invention include;

Silicone lubricant; "SHINETSU SILICONE" (Shinetsu Chemical Co., Ltd.) "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18 (Nippon Fine Chemical Co., Ltd.), "AMIDE-O (Nitto Kagaku K.K.), "DIAMID O-200" and "DIAMID G-200" (Nippon Kasei Chemical Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.)

Alkylamine lubricants; "ELECTROSTRIPPER TS-2", "ELECTROSTRIPPER TS-3" (Kao Corp.)

Suitable content of the lubricant is 0.01 to 1 wt. % so as not to adversely affect the photographic photosensitive materials. Various additives may be added to one or more of the above layers. Examples of the additives are described below. Two or more lubricants may be blended. The number of carbon atom of the fatty acid amide lubricants suitable for the invention is 8 to 50, preferably 15 to 35.

(1) Plasticizer; phthalic acid esters, glycol esters, fatty acid esters, phosphoric acid esters, etc.

(2) Stabilizer; lead compounds, cadmium compounds, zinc compounds, alkaline earth metal compounds, organic tin compounds, etc.

(3) Antistatic agent; cationic surfactants, anionic surfactants, nonionic surfactants, ampholytic surfactants, etc.

(4) Flame retardant; phosphoric acid esters, phosphoric acid ester halides, halides, inorganic materials, polyols containing phosphor, etc.

(5) Filler; alumina, kaolin, clay, calcium carbonate, mica, talc, titanium oxide, silica, etc.

(6) Reinforcing agent; glass lobing, metallic fiber, glass fiber, glass milled fiber, carbon fiber, etc.

(7) Coloring agent; inorganic pigments (Al, $Fe_2O_3$, $TiO_2$, ZnO, CdS, etc.), organic pigments, dyes, etc.

(8) Blowing agent; inorganic blowing agents (ammonium carbonate, sodium hydrogen carbonate), organic blowing agents (nitroso compounds, azo compounds), etc.

(9) Vulcanizing agent; vulcanization accelerator, acceleration assistant, etc.

(10) Deterioration preventing agent; ultraviolet absorber, antioxidant, metal deactivator, peroxide decomposing agent, etc.

(11) Nucleating agent; organic nucleating agents (di-substituted benzilidene sorbitol, etc.), inorganic nucleating agents, etc.

(12) Coupling agent; silane compounds, titanium compounds, chromium compounds, aluminum compounds, etc.

(13) Various thermoplastic resins, rubbers

The packaging material of the invention is suitable for packaging silver halide photographic photosensitive materials, diazo photographic photosensitive materials, photosensitive resins, self-developing type photographic materials and diffusion-transfer type photographic materials, etc. This packaging material is also usable for packaging foods such as chocolate, margarine, miso, wine and beer, medicines, dyes and other chemical materials such as developing solutin and mordants for dyeing and the like. This packaging material is particularly suitable for the moistureproof light-shielding double sheet bag for photographic photosensitive materials of which quality is degarded by a small amount of a gas, light or moisture.

Package form may be conventional, and includes a single-sheet flat bag, a double-sheet flat bag, a square bottom bag, a self-standing bag, a single-sheet gusset bag, a double-sheet gusset bag, a film sheet, inner lining for a moistureproof box and a leader paper.

The bag-making may be carried out according to the known adhesion method of plastic films, such as flame melt adhesion hot blast adhesion, hot plate adhesion, impulse heat sealing, fusing, supersonic adhesion or high frequency sealing. The bag-making may also be carried out by the method using an adhesive such as gum adhesive, hot melt adhesive, solution adhesive, pressure-sensitive adhesive or heat-sensitive adhesive.

In the curl resistant packaging material of the invention, the high Young's modulus thermoplastic resin film layer curls to the opposite side because of low hygroscopicity, and it decreases the curling of the whole packaging material. This layer also raises tensile strength. The light-light-shielding ethylene copolymer rsin film layer improves tear strength and impact puncture strength, and it also secures heat sealing properties and light-shielding. The flexible sheet layer supplements physical strength. This packaging material does not curl during its production, and it is excellent in bag-making processability. the packaging material has a sufficient physical strength, though it is thin. It is also excellent in heat sealing properties and wear resistance.

In the packaging material suitable for heavy photographic photosensitive material having sharp edges, the polyolefin resin film layer prevents curling and elongation, and it secures tensile strength, surface strength, wear resistance, antiblocking and slipping character. The ethylene copolymer resin film layer secures tear strength, impact puncture strength and elongation. The metallized flexible sheet layer secures moistureproofness, gas barrier, antistatic property and prevention of the temperature elevation under the sunlight. The other flexible sheet layer secures prevention of scratches, tensile strength and heat resistance, and it also protects the metallized flexible sheet layer. This packaging material is excellent in physical strength such as tear strength. Therefore, when it packages heavy photosensitive materials having sharp edges, it is not broken due to tears of punctures. It is also excellent in wear resistance, light-shielding, moistureproofness, heat sealing properties and bag-making ability for automatic bag-making machine.

In the packaging material tearable by hand, the combination of the coextruded multilayer film layer and the biaxially stretched thermoplastic resin film layer makes tearability by hand acceptable, and it secures heat sealing properties, physical strength, moistureproofness, wear resistance and bag-making ability for automatic bag-making machine. The curling of the packaging material is also low.

EXAMPLES

Representative curl resistant packaging materials of the invention are illustrated in FIGS. 1 to 6.

Figure 7:
FIG. 7 is a side view indicating a curling state of a packaging material of the invention.

The packaging material of FIG. 1 consists of a coextruded multilayer film layer 4a consisting of a light-shielding high Young's modulus thermoplastic resin film layer 2a and a light-shielding ethylene copolymer resin film layer 3a and a flexible sheet layer 1 laminated thereon through an adhesive layer 5. As shown in FIG. 7, this packaging material hardly curls.

Figure 2:
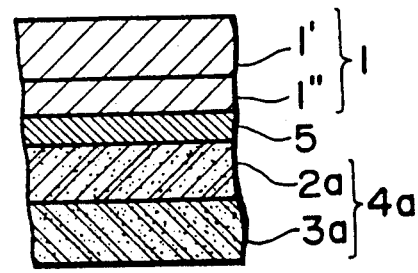

The packaging material of FIG. 2 is the same as the packaging material of FIG. 1 except that the flexible sheet layer 1 is a coextruded layer of two flexible sheet layers 1', 1".

Figure 3:
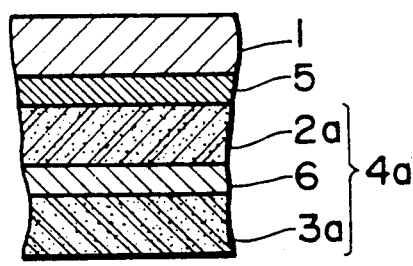

The packaging material of FIG. 3 is the same as the packaging material of FIG. 1 except that the coextruded multilayer film layer 4a is a triple layer further containing an intermediate layer 6.

Figure 4:
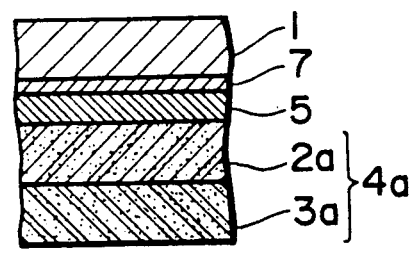

The packaging material of FIG. 4 is the same as the packaging material of FIG. 1 except that the inner surface of the flexible sheet layer 1 is coated with a coating layer 7 for the improvement of adhesive force, moistureproofness and gas barrier.

Figure 5:
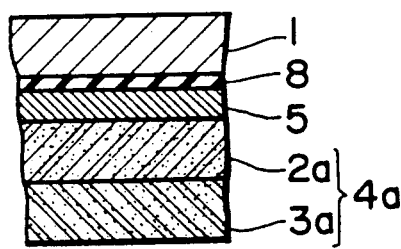

The packaging material of FIG. 5 is the same as the packaging material of FIG. 1 except that the flexible sheet layer 1 is metallized with a metallic membrane layer 8 such as aluminum metallized flexible sheet.

Figure 6:
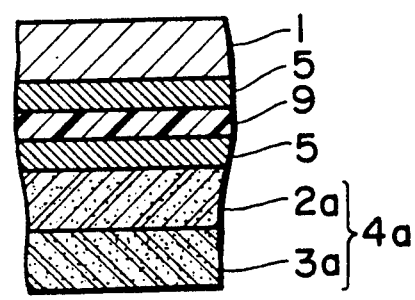

The packaging material of FIG. 6 is the same as the packaging material of FIG. 1 except that a metal foil layer 9 is further laminated between the coextruded multilayer film layer 4a and the flexible sheet layer 1 through an adhesive layer 5.

Comparative packaging materials to the packaging material of the invention are shown in FIGS. 8 to 11.

Figure 8:
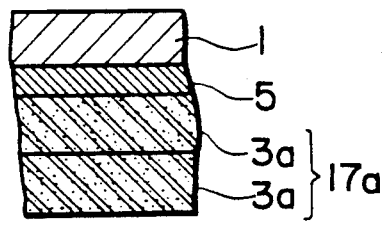
FIGS. 8 to 11 are sectional views of comparative packaging materials.
Figure 12:
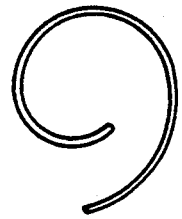
FIGS. 12 to 14 are side views indicating curling states of comparative packaging materials.

The packaging material of FIG. 8 consists of a coextruded double layer film layer 17a consisting of two light-shielding ethylene copolymer resin film layer 3a, 3a and a flexible sheet layer 1 laminated thereon through an adhesive layer 5. As shown in FIG. 12, this packaging material sharply curls.

Figure 9:
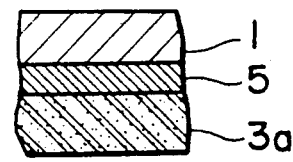
Figure 13:
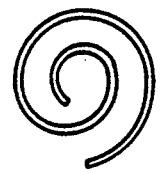

The packaging material of FIG. 9 consists of a light-shielding ethylene copolymer resin film layer 3a and a flexible sheet layer 1 laminated thereon through an adhesive layer 5. As shown in FIG. 13, this packaging material coils twice or more in a cylindrical form.

Figure 10:
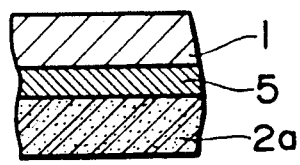
Figure 14:
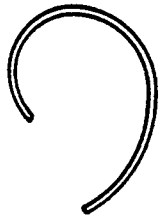

The packaging material of FIG. 10 consists of a light-shielding high Young's modulus thermoplastic resin film layer 2a and a flexible sheet layer 1 laminated thereon through an adhesive layer 5. This packaging material curls as shown in FIG. 14. Moreover, tear strength and impact puncture strength are weak.

Figure 11:
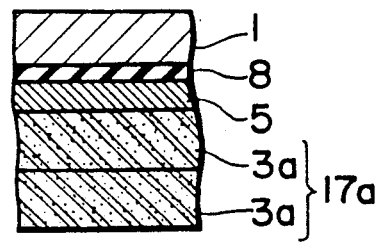

The packaging material of FIG. 11 consists of a coextruded double layer film layer 17a consisting of two light-shielding ethylene copolymer resin film layer 3a, 3a and a metallized flexible sheet layer 1 metallized with a metallic membrane layer 8 such as aluminum metallized flexible sheet laminated thereon through an adhesive layer 5. This packaging material sharply curls as shown in FIG. 13.

Figure 15:
FIGS. 15 to 17 are sectional views indicating curling states of other films.

FIG. 15 indicates the curling state of the coextruded multilayer film 4a consisting of a light-shielding high Young's modulus thermoplastic resin film layer 2a and a light-shielding ethylene copolymer resin film layer 3a. As shown in the drawing, the coextruded film layer 4a curls on the side of the high Young's modulus thermoplastic resin film layer 2a.

Figure 16:
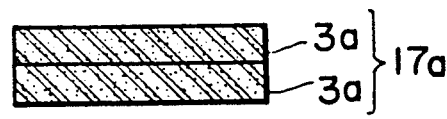

FIG. 16 indicates the curling state of a coextruded double layer film layer 17a of two light-shielding ethylene copolymer resin film layers 3a, 3a. Since the two layers have almost the same composition and hygroscopicity, this film layer 17a does not curl.

Figure 17:

FIG. 17 indicates the curling state of a single layer film of a light-shielding ethylene copolymer resin film layer 3a. Curling does not occur.

Various properties were measured as to the packaging materials of the invention I, II, III, a comparative packaging material I and a conventional packaging material I, and the results are shown in Table 1.

The packaging material of the invention I corresponds to the packaging material of FIG. 2, and composed of the following layers.

| Flexible sheet layer 1: | |
|---|---|
| Biaxially stretched coextruded double layer film of polypropylene layer and polyethylene layer | |
| Thickness; | 20 μm |
| Adhesive layer 5: | |
| LDPE resin extrusion laminate adhesive layer | |
| Thickness; | 15 μm |
| High Young's modulus thermoplastic resin film layer 2a: | |
| HDPE resin | 98.5 wt. % |
| Carbon black | 1.5 wt. % |
| Thickness; | 35 μm |
| Young's modulus; | 103 kg/mm² |
| Hygroscopic amount; | 1.03% |
| Light-shielding ethylene copolymer resin film layer 3a: | |
| L-LDPE resin | 97 wt. % |
| Carbon black | 3 wt. % |
| Thickness; | 35 μm |
| Hygroscopic amount; | 2.42% |

The packaging material of the invention II corresponds to the packaging material of FIG. 4, and composed of the following layer.

| Flexible sheet layer 1: | |
|---|---|
| Biaxially stretched polypropylene resin film | |
| Thickness; | 20 μm |
| Coating layer 7: | |
| Polyvinylidene chloride resin | |
| Adhesive layer 5: | |
| The same as the packaging material of the invention I | |
| High Young's modulus thermoplastic resin film layer 2a: | |
| HDPE resin | 70 wt. % |
| L-LDPE resin | 28 wt. % |
| Aluminum paste | 2 wt. % |
| Thickness; | 35 μm |
| Young's modulus; | 71 kg/mm² |
| Hygroscopic amount; | 0.35% |
| Light-shielding ethylene copolymer resin film layer 3a: | |
| L-LDPE resin | 70 wt. % |

-continued

| | |
|---|---|
| HDPE resin | 27 wt. % |
| Carbon black | 3 wt. % |
| Thickness; | 35 μm |
| Hygroscopic amount; | 2.18% |

The packaging material of the invention III corresponds to the packaging material of FIG. 5, and composed of the following layers.

| | |
|---|---|
| Flexible sheet layer 1: | |
| Biaxially stretched polypropylene resin film | |
| Thickness; | 12 μm |
| Metallic membrane layer 8: | |
| Aluminum vacuum metallizing | |
| Thickness; | 400 Å |
| Adhesive layer 5: | |
| The same as the packaging material of the invention I | |
| High Young's modulus thermoplastic resin film layer 2a: | |
| HDPE resin | 97 wt. % |
| Carbon black | 3 wt. % |
| Thickness; | 35 μm |
| Young's modulus; | 98 kg/mm² |
| Hygroscopic amount; | 1.76% |
| Light-shielding ethylene copolymer resin film layer 3a: | |
| L-LDPE resin | 67 wt. % |
| EEA resin | 30 wt. % |
| Carbon black | 3 wt. % |
| Thickness; | 35 μm |
| Hygroscopic amount; | 2.73% |

The comparative packaging material I corresponds to the packaging material of FIG. 9, and composed of the following layers.

| | |
|---|---|
| Flexible sheet layer 1: | |
| Biaxially stretched polyester resin film | |
| Thickness; | 12 μm |
| Adhesive layer 5: | |
| The same as the packaging material of the invention I | |
| Light-shielding ethylene copolymer resin film layer 3a: | |
| L-LDPE resin | 97 wt. % |
| Carbon black | 3 wt. % |
| Thickness; | 70 μm |
| Hygroscopic amount; | 2.36% |

Figure 19:
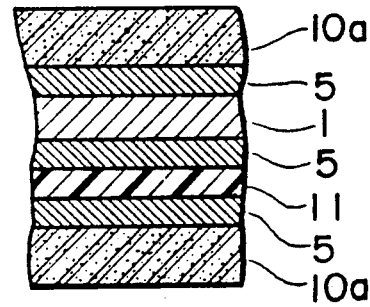
Figure 20:
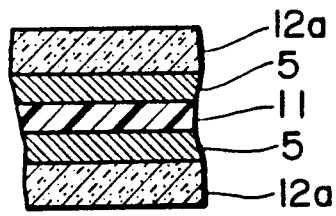
Figure 21:
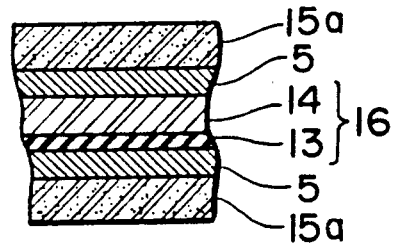

The conventional packaging material I coresponds to the packaging material of FIG. 19, and composed of the following layers.

| | |
|---|---|
| Light-shielding LDPE resin film layer: | |
| LDPE resin | 97 wt. % |
| Carbon black | 3 wt. % |
| Adhesive layer 5: | |
| The same as the packaging material of the invention I | |
| Flexible sheet layer 1: | |
| Bleached kraft paper | |
| Areal weight; | 35 g/m² |
| Aluminum foil layer 11: | |
| Thickness; | 7 μm |
| Light-shielding LDPE resin film layer 10a: | |
| LDPE resin | 67 wt. % |
| Synthetic rubber | 30 wt. % |
| Carbon black | 3 wt. % |
| Thickness; | 50 μm |

-continued

| | |
|---|---|
| Hygroscopic amount | 2.57% |

The above resins and other materials used are as follows:

| | |
|---|---|
| HDPE resin: | |
| Packaging materials of the invention I and III | |
| "HIZEX 3300F" (Mitsui Petrochemical Industries Co., Ltd.) | |
| MI; | 0.90 g/10 minutes |
| Density; | 0.954 g/cm³ |
| Packaging material of the invention II | |
| "HIZEX 5300 S" (Mitsui Petrochemical Industries Co., Ltd.) | |
| MI; | 0.40 g/10 minutes |
| Density; | 0.964 g/cm³ |
| L-LDPE resin: | |
| "ULTZEX 2020L" (Mitsui Petrochemical Industries Co., Ltd.) | |
| MI; | 2.1 g/10 minutes |
| Density; | 0.920 g/cm³ |
| α-Olefin; | 4-Methylpentene-1 |
| LDPE resin: | |
| "DFD-0111" (Nippon Unicar Co., Ltd.) | |
| MI; | 2.4 g/10 minutes |
| Density; | 0.923 g/cm³ |
| EEA resin: | |
| "NUC 6170" (Nippon Unicar Co., Ltd.) | |
| MI; | 6 g/10 minutes |
| Density; | 0.931 g/cm³ |
| LDPE resin extrusion laminate layer: | |
| "MIRASON 14" (Mitsui Polychemicals Co., Ltd.) | |
| MI; | 5.1 g/10 minutes |
| Density; | 0.919 g/cm³ |
| Carbon black: | |
| "#44B OIL FURNACE CARBON BLACK" (Mitsui Chemical Industries Ltd.) | |
| Mean particle size; | 21 mμ |
| pH; | 7.7 |

TABLE 1

| | Invention | | | Comparative I | Conventional I |
|---|---|---|---|---|---|
| | I FIG. 2 | II FIG. 4 | III FIG. 5 | FIG. 9 | FIG. 19 |
| Curling | A | A | B | E | A-B |
| Bag Breakage by Vibration | A | B | A | C | D |
| Moisture-proofness (g/m² · 24 hrs.) | 2.3 | <1 | <1 | 6.3 | <1 |
| | B | A | A | C-D | A |
| Cost Ratio | 36 | 39 | 46 | 39 | 100 |
| | A | A | A | A | E |

Evaluations in Table was carried out as follows:

| | |
|---|---|
| A | very excellent |
| B | excellent |
| C | practial |
| D | having a problem |
| E | impractical |

Testing methods were as follows;
Melt Index; ASTM D-1238
Density; ASTM D-1505
Cursing; A circular test piece having 10 cm in diameter was prepared from the sheet to be tested. A 1 kg load plate put on the test piece, and allowed to stand at 20- C. at 65% humidity for 24 hours. Thereafter, the test piece was put on a flat plate, and allowed to stand for 24 hours under the same conditions without loading. The curling was evaluated by the curling state.

Bag Breakage by Vibration; JIS Z-0200-1976
Moistureproofness; JIS Z-0208
Cost Ratio; The cost ration compared to the conventional packaging material I.

Representative packaging materials of the invention suitable for heavy photographic photosensitive materials are illustrated in FIGS. 22 to 29.

Figure 22:
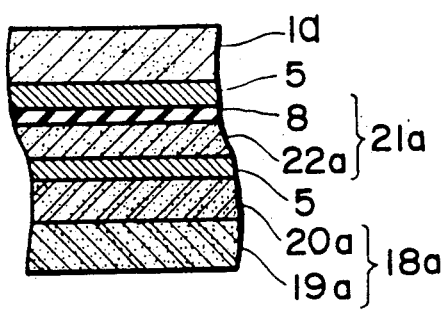
FIGS. 22 to 29 are sectional views of preferred embodiments of the invention suitable for heavy photographic photosensitive materials having sharp edges.

The packaging material of FIG. 22 consists of a coextruded multilayer film layer 18a consisting of a light-shielding polyolefin resin film layer 19a and a light-shielding ethylene copolymer resin film layer 20a, a light-shielding metallized flexible sheet layer 21a consisting of a metallic membrane layer 8 and a light-shielding flexible sheet layer 22a laminated thereon through an adhesive layer 5, and another light-shielding flexible sheet layer 1a further laminated thereon through an adhesive layer 5.

Figure 23:
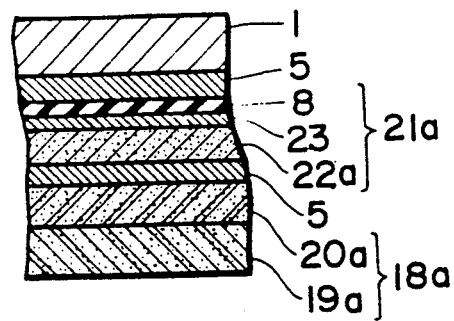

The packaging material of FIG. 23 is the same as the packaging material of FIG. 22 except that the flexible sheet layer 22a is provided with an anchor coating layer 23 and that no light-shielding material is added to the other flexible sheet layer 1.

Figure 24:
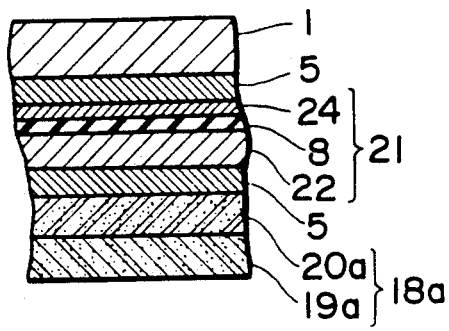

The packaging material of FIG. 24 is the same as the packaging material of FIG. 22 except that a protective layer 24 is provided on the metallic membrane layer 8 and that no light-shielding material is added to the other flexible sheet layer 1 and the flexible sheet layer to be metallized.

Figure 25:
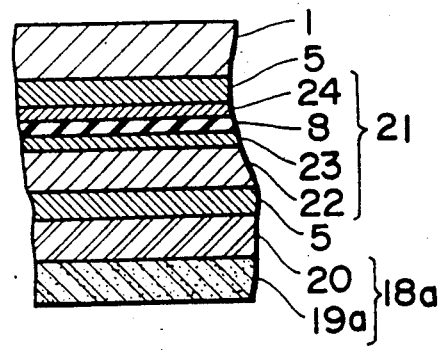

The packaging material of FIG. 25 is the same as the packaging material of FIG. 24 except that an anchor coating layer 23 is provided on the surface of the flexible sheet layer 4 to be metallized and that no light-shielding material is added to the ethylene copolymer resin film layer 20.

Figure 26:
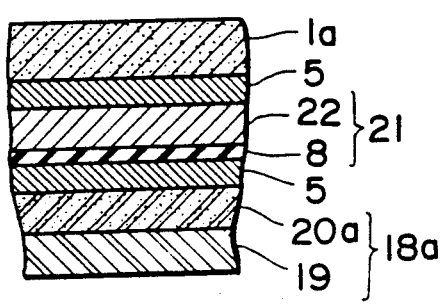

The packaging material of FIG. 26 is the same as the packaging material of FIG. 22 except that the metallic membrane layer 8 of the metallized flexible sheet layer 21a is located on the side of the coextruded multilayer film layer 18a and that no light-shielding material is added to the flexible sheet layer 22 to be metallized nor the polyolefin resin film layer 19.

Figure 27:
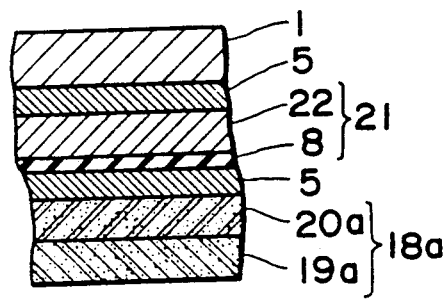

The packaging material of FIG. 27 is the same as the packaging material of FIG. 26 except that no light-shielding material is added to the flexible sheet layer 1 whereas that a light-shielding material is added to the polyolefin resin film layer 19a.

Figure 28:
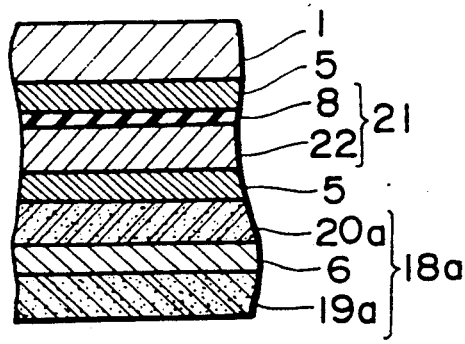

The packaging material of FIG. 28 is the same as the packaging material of FIG. 22 except that an intermediate layer 6 is provided in the coextruded multilayer film layer 18a and that no light-shielding material is added to the flexible sheet layer 22 to be metallized nor the other flexible sheet layer 1.

Figure 29:
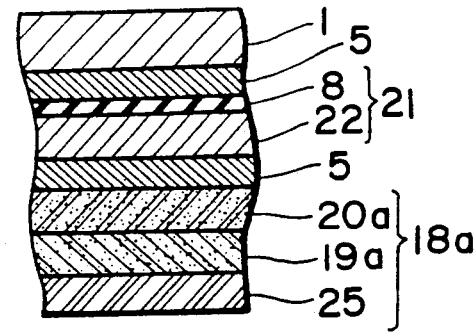

The packaging material of FIG. 29 is the same as the packaging material of FIG. 28 except that the intermediate layer is not provided and instead that a heat sealing layer 25 is provided under the polyolefin resin film layer 19a.

Figure 30:
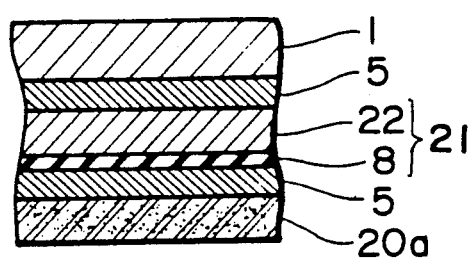
FIGS. 30 and 31 are sectional views of comparative packaging materials.
Figure 31:
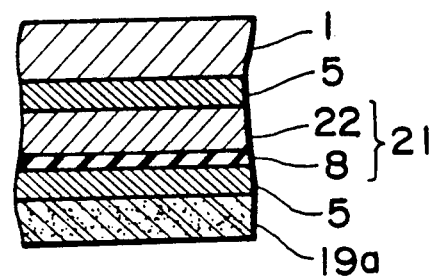
Figure 32:
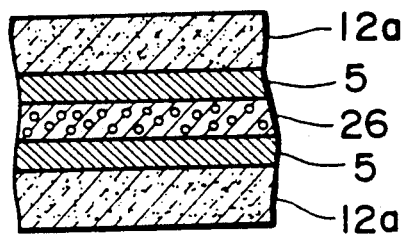
FIG. 32 is a sectional view of a conventional packaging material.

FIGS. 30 and 31 indicate two comparative packaging materials to the packaging material of the invention suitable for weight photographic photosensitive materials having sharp edges.

The packaging material of FIG. 30 consists of a light-shielding ethylene copolymer resin film layer 20a, a metallized flexible sheet layer 21a consisting of a flexible sheet layer 22 and a metallic membrane layer 8 laminated thereon through an adhesive layer 5 so that the metallic membrane layer 8 is directed to the ethylene copolymer resin film layer 20a, and another flexible sheet layer 1 further laminated thereon through an adhesive layer 5.

The packaging material of FIG. 31 is the same as the packaging material of FIG. 30 except that the ethylene copolymer resin film layer 20a is replaced by a light-shielding polyolefin resin film layer 19a.

Various properties were measured as to the packaging materials of the invention IV to VIII, a comparative packaging material II and conventional packaging materials II, III, and the results are shown in Table 2.

The packaging material of the invention IV corresponds to the packaging material of FIG. 23, and composed of the following layers.

| Flexible sheet layer 1: | |
|---|---|
| Semibleached kraft paper | |
| Areal weight; | 50 g/m$^2$ |
| Adhesive layer 5: | |
| LDPE resin extrusion laminate adhesive layer | |
| Thickness; | 15 μm |
| Metallic membrane layer 8: | |
| Aluminum vacuum metallizing | |
| Thickness; | 400 Å |
| Anchor coating layer 23: | |
| Polyisocyanate anchor coating agent | |
| Flexible sheet layer 22a: | |
| Biaxially stretched nylon film | |
| Thickness; | 15 μm |
| Adhesive layer 5: | |
| The same as above | |
| Coextruded multilayer film layer 18a: | |
| Thickness; | 50 μm |
| Young's modulus in longitudinal direction; | 108 kg/mm$^2$ |
| Formal by inflation molding machine | |
| Ethylene copolymer resin film layer 20a: | |
| L-LDPE resin | 92 wt. % |
| ("ULTZEX 2020L", Mitsui Petrochemical Industries.Co., Ltd., MI; 2.1 g/10 minutes, Density; 0.920 g/cm$^3$) | |
| LDPE resin | 5 wt. % |
| ("DFD-0111", Nippon Unicar Co., Ltd., MI; 2.4 g/10 minutes, Density; 0.923 g/cm$^3$) | |
| Carbon black | 3 wt. % |
| Thickness; | 25 μm |
| Polyolefin resin film layer 19a: | |
| HDPE resin | 97 wt. % |
| ("HIZEX 5300S", Mitsui Petrochemical Industries Co., Ltd., MI; 0.40 g/10 minutes, Density; 0.964 g/cm$^3$) | |
| Carbon black | 3 wt. % |
| Thickness; | 25 μm |
| Young's modulus in longitudinal direction | 143 kg/mm$^2$ |

The packaging material of the invention V corresponds to the packaging material of FIG. 27, and composed of the following layers.

| Flexible sheet layer: | |
|---|---|
| Biaxially stretched polypropylene film | |
| Thickness; | 20 μm |
| Adhesive layer 5: | |
| The same as the packaging material of the invention IV | |
| Flexible sheet layer 22: | |
| Biaxially stretched polyester film | |
| Thickness; | 12 μm |
| Metallic membrane layer 8: | |
| The same as the packaging material of the invention IV | |

-continued

| | |
|---|---|
| Adhesive layer 5: | |
| The same as above | |
| Coextruded multilayer film layer 18a: | |
| The same as the packaging material of the invention IV | |

The packaging material of the invention VI corresponds to the packaging material of FIG. 27, and composed of the following layers.

| | |
|---|---|
| Flexible sheet layer 1: | |
| Bleached kraft paper | |
| Areal weight; | 35 g/m² |
| Adhesive layer 5: | |
| The same as the packaging material of the invention IV | |
| Metallized flexible sheet layer 21a: | |
| The same as the packaging material of the invention IV | |
| Adhesive layer 5: | |
| The same as above | |
| Coextruded multilayer film layer 18a: | |
| Thickness; | 60 μm |
| Young's modulus in longitudinal direction; | 81 kg/mm² |
| Formed by inflation molding machine | |
| Ethylene copolymer resin film layer 20a: | |
| L-LDPE resin | 80 wt. % |
| ("ULTZEX 2020L", Mitsui Petrochemical Industries Co., Ltd., MI; 2.1 g/10 minutes, Density: 0.920 g/cm³) | |
| HDPE resin | 17 wt. % |
| ("NISSEKI STAFLENE E 807 (F)" Nippon Petrochemicals Co., Ltd., MI; 0.6 g/10 minutes, Density; 0.950 g/cm³) | |
| Carbon black | 3 wt. % |
| Thickness; | 25 μm |
| Polyolefin resin film layer 19a: | |
| HDPE resin | 80 wt. % |
| ("NISSEKI STAFLENE E 807 (F)") | |
| L-LDPE resin | 17 wt. % |
| ("MORETECH 0138N" copolymer of ethylene and octene-1, Idemitsu Petrochemical Co., Ltd., MI; 1 g/10 minutes, Density; 0.920 g/cm³) | |
| Carbon black | 3 wt. % |
| Thickness; | 35 μm |
| Young's modulus in longitudinal direction; | 128 kg/mm² |

The packaging material of the invention VII corresponds to the packaging material of FIG. 27, and composed of the following layers.

| | |
|---|---|
| Flexible sheet layer 1: | |
| The same as the packaging material of the invention V | |
| Adhesive layer 5: | |
| The same as the packaging material of the invention IV | |
| Metallized flexible sheet layer 21a: | |
| The same as the packaging material of the invention IV | |
| Adhesive layer 5: | |
| The same as above | |
| Coextruded multilayer film layer 18a: | |
| Thickness; | 60 μm |
| Young's modulus in longitudinal direction; | 93 kg/mm² |
| Ethylene copolymer resin film layer 20a: | |
| L-LDPE resin | 70 wt. % |
| ("ULTZEX 2020L") | |
| EEA resin | 27 wt. % |
| ("EEA 6170", Nippon Unicar Co., Ltd. MI; 6 g/10 minutes, Density; 0.931 g/cm³) | |
| Carbon black | 3 wt. % |

-continued

| | |
|---|---|
| Thickness: | 35 μm |
| Polyolefin resin film layer 19a: | |
| The same as the packaging material of the invention IV | |

The packaging material of the invention VIII corresponds to the packaging material of FIG. 23, and composed of the following layers.

| | |
|---|---|
| Flexible sheet layer 1: | |
| The same as the packaging material of the invention IV | |
| Adhesive layer 5: | |
| The same as the packaging material of the invention IV | |
| Metallized flexible sheet layer 21a: | |
| The same as the packaging material of the invention IV | |
| Adhesive layer 5: | |
| The same as above | |
| Coextruded multilayer film layer 18a: | |
| Thickness; | 70 μm |
| Young's modulus in longitudinal direction; | 56 kg/mm² |
| Ethylene copolymer resin film layer 20a: | |
| L-LDPE resin | 50 wt. % |
| ("ULTZEX 2021L", Mitsui Petrochemical Industries Co., Ltd., MI; 2.1 g/10 minutes, Density; 0.923 g/cm³) | |
| Conductive resin | 50 wt. % |
| ("KVC 6078", Nippon Unicar Co., Ltd.) | |
| Thickness; | 35 μm |
| Polyolefin resin film layer 19a: | |
| HDPE resin | 97 wt. % |
| ("HIZEX 3300F", Mitsui Petrochemical Industries Co., Ltd., MI; 1.1 g/10 minutes, Density; 0.954 g/cm³) | |
| Carbon black | 3 wt. % |
| Thickness; | 35 μm |
| Young's modulus in longitudinal direction; | 86 kg/mm² |

The comparative packaging material II corresponds to the packaging material of FIG. 30, and composed of the following layers.

| | |
|---|---|
| Flexible sheet layer 1: | |
| The same as the packaging material of the invention IV | |
| Adhesive layer 5: | |
| The same as the packaging material of the invention IV | |
| Metallized flexible sheet layer 21a: | |
| The same as the packaging material of the invention IV | |
| Adhesive layer 5: | |
| The same as above | |
| Ethylene copolymer resin film layer 20a: | |
| Having the same composition as the packaging material of the invention IV | |
| Thickness; | 70 μm |
| Young's modulus in longitudinal direction; | 28 kg/mm² |

Figure 18:
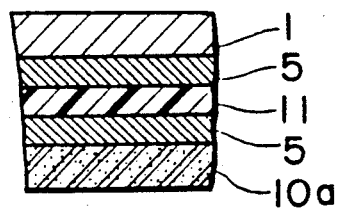
FIGS. 18 to 21 are sectional views of conventional packaging materials.

The conventional packaging material II corresponds to the packaging material of FIG. 18, and composed of the following layers.

| | |
|---|---|
| Flexible sheet layer 1: | |
| Bleached kraft paper | |
| Areal weight; | 35 g/m² |
| Adhesive layer 5: | |
| The same as the packaging material of the invention IV | |

-continued

| Aluminum foil layer 11: | |
|---|---|
| Thickness; | 7 μm |
| Adhesive layer 5: | |
| The same as above | |
| LDPE resin film layer 10a: | |
| LDPE resin | 97 wt. % |
| ("DFD-0111") | |
| Carbon black | 3 wt. % |
| Thickness; | 70 μm |
| Young's modulus in longitudinal direction; | 33 kg/mm$^2$ |

The conventional packaging material III corresponds to the packaging material of FIG. 19, and composed of the following layers.

| LDPE resin filmlayer 10a (Upper): | |
|---|---|
| LDPE resin | 97 wt. % |
| ("DFD-0111") | |
| Carbon black | 3 wt. % |
| Thickness; | 50 μm |
| Young's modulus in longitudinal direction; | 33 kg/mm$^2$ |
| Adhesive layers 5 (all): | |
| The same as the packaging material of the invention IV | |
| Flexible sheet layer 1: | |
| The same as the conventional packaging material II | |
| Aluminum foil layer 11: | |
| The same as the conventional packaging material II | |
| LDPE resin film layer 10a (Lower): | |
| LDPE resin: 67 wt. % | |
| ("DFD-0111") | |
| Synthetic rubber | 30 wt. % |
| Carbon black | 3 wt. % |
| Thickness; | 50 μm |
| Young's modulus in longitudinal direction; | 27 kg/mm$^2$ |

The carbon black used was oil furnace carbon black "#44B OIL FURNACE CARBON BLACK" (Mistsubishi Chemical Industries Ltd., Mean Particle size; 21 mμ, pH; 7.7).

Bag Breakage by Vibration:

Sheet color photographic printing papers using polyethylene laminate support weighing 2 kg were placed in a three-sided fin seal flat bag, and this flat bag was sealed and put in a decorated box. Ten decorated boxes were placed in a corrugated board box. The corrugated board boxes were stacked in double in two rows, and fixed by using rubber, bands. The vibration test was carried out according to JIS Z-0322, and the breakage state of the bags was judged by observation.

Wear Resistance:

In the above vibration test, wear resistance was judged by the amount of black powder adhered on the color photographic printing papers estimated by observation.

Tensile Strength: JIS P-8113

Surface-Reverse Judgment:

Distinguishability of the surface and the reverse side of the packaging material by the naked eye or tactility uunder a safety light during the packaging process of photosensitive materials.

Representative packaging materials of the invention tearable by hand are illustrated in FIGS. 33 to 40.

Figure 33:
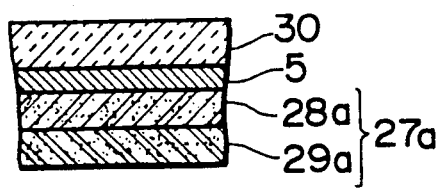
FIGS. 33 to 40 are sectional views of preferred embodiments of the invention tearable by hand.

The packaging material of FIG. 33 consists of a coextruded multilayer film layer 27a consisting of a light-shielding high density high crystallinity polyethylene resin film layer 28a and a light-shielding ethylene copolymer resin film layer 29a and a biaxially stretched thermoplastic resin film layer 30 laminated on the high density high crystallinity polyethylene resin film layer 28a through an adhesive layer 5.

Figure 34:
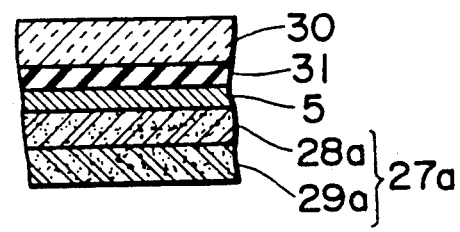

The packaging material of FIG. 34 is the same as the packaging material OF FIG. 33 except that the biaxially stretched thermoplastic resin film layer 30 is provided with a modified layer 31 on the side of the adhesive layer 5.

Figure 35:
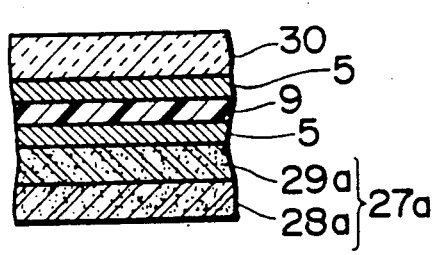

The packaging material of FIG. 35 consists of the coextruded multilayer film layer 27a of FIG. 33, a metal foil layer 9 laminated on the ethylene copolymer resin film layer 29a of the coextruded multilayer film layer through an adhesive layer 5 and a biaxially stretched

TABLE 2

| | Invention | | | | | Comparative II | Conventional | |
|---|---|---|---|---|---|---|---|---|
| | IV FIG. 23 | V FIG. 27 | VI FIG. 27 | VII FIG. 27 | VIII FIG. 23 | FIG. 30 | II FIG. 18 | III FIG. 19 |
| Wear Resistance | A | A | B | A | B | C | D | D |
| Bag Breakage by Vibration | A | A | A-B | A | B | C | D-E | D |
| Tensile Strength | | | | | | | | |
| Longitudinal (kg/15 mm Width) | 10.4 | 9.2 | 9.3 | 9.8 | 11.5 | 5.8 | 5.3 | 6.1 |
| Lateral | 6.7 | 5.8 | 5.9 | 6.2 | 7.6 | 4.9 | 4.6 | 5.2 |
| Surface-Reverse Judgment | O | O | O | O | O | O | O | X |

Evaluations in Table 2 were carried out as follows;

| A | very excellent |
|---|---|
| B | excellent |
| C | practial |
| D | having a problem |
| E | impractical |

Testing methods were as follows:
Melt Index; ASTM D-1238
Density; ASTM D-1505
Thickness; JIS P-8118
Young's Modulus; ASTM D-638 thermoplastic resin film layer 30 further laminated thereon through an adhesive layer 5.

Figure 36:
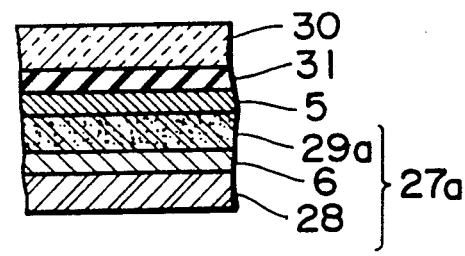

The packaging material of FIG. 36 is the same as the packaging material of FIG. 34 except that the coextruded multilayer film layer 27a is provided with an intermediate layer 6, that no light-shielding material is added to the high density high crystallinity polyethylene resin film layer 28, and that the flexible sheet layer 30 is laminated on the side of the ethylene copolymer resin film layer 29a.

Figure 37:
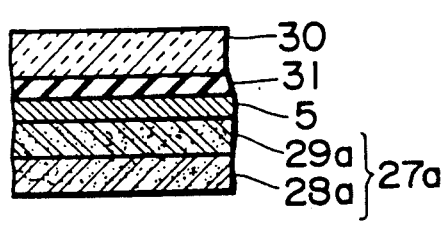

The packaging material of FIG. 37 is the same as the packaging material of FIG. 34 except that the flexible sheet layer 30 is laminated on the side of the ethylene copolymer resin film layer 29a.

Figure 38:
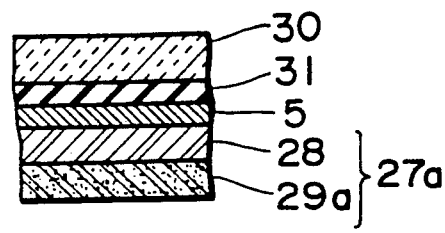

The packaging material of FIG. 38 is the same as the packaging material of FIG. 34 except that no light-shielding material is added to the high density high crystallinity polyethylene resin film layer 28.

Figure 39:
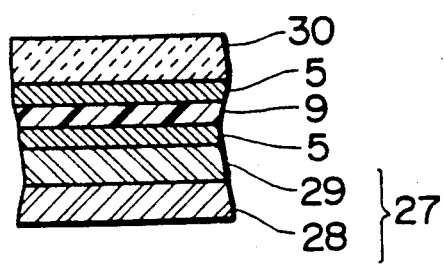

The packaging material of FIG. 39 is the same as the packaging material of FIG. 35 except that the coextruded multilayer film layer 27 does not contain a light-shielding material.

Figure 40:
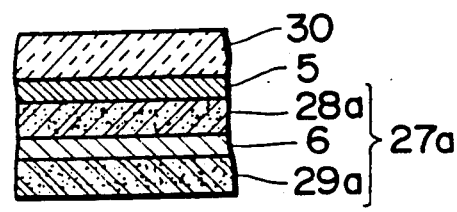

The packaging material of FIG. 40 is the same as the packaging material of FIG. 33 except that the coextruded multilayer film layer 27a is provided wiht an intermediate layer 6.

Figure 41:
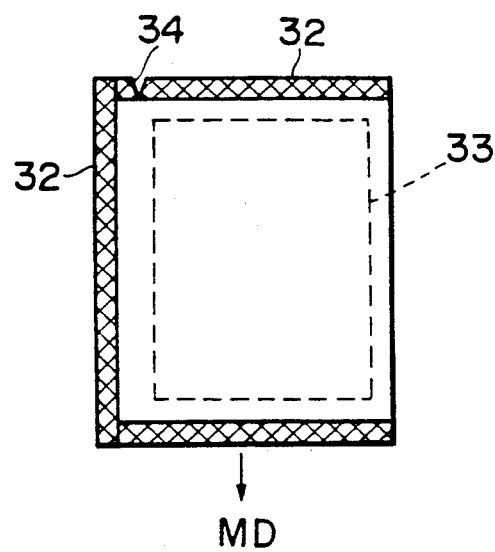
FIGS. 41 to 43 are plan views of packaging bags formed of the tearable packaging material of the invention.
Figure 42:
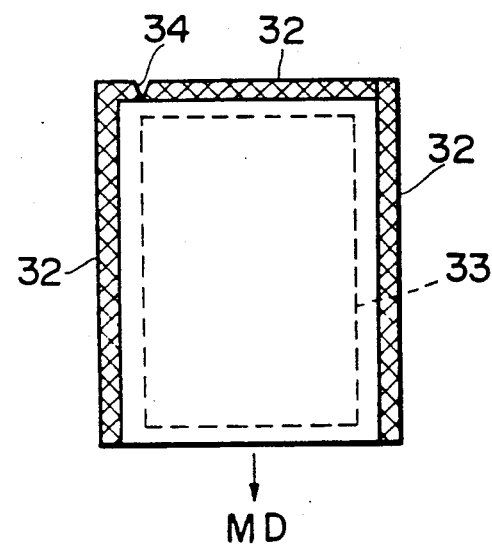
Figure 43:
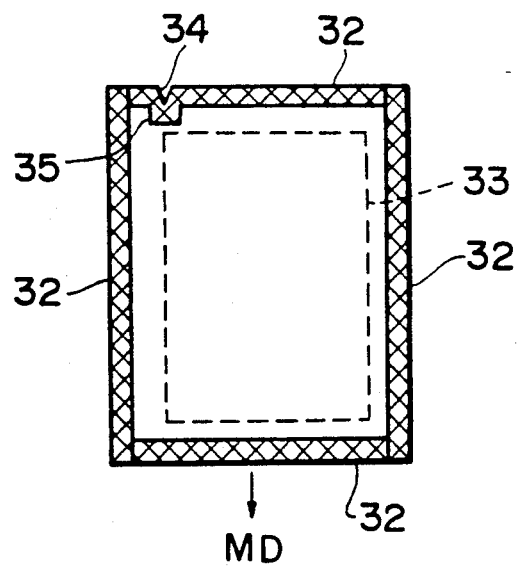

Examples of the packaging bags made of the packaging material of the invention tearable by hand are illustrated in FIGS. 41 to 43.

The packaging bag of FIG. 41 is a three-sided fin seal bag, and made by turning the packaging material. Two adjoining sides 32, 34 other than the turned side are heat-sealed, and photosensitive materials 33 are inserted into the bag through the opening. Then the remaining side 32 is heat-sealed, and a V-shaped notch 34 is formed near the end of one side 32 so as to tear in the longitudinal direction (MD).

The packaging bag of FIG. 42 is the same as the packaging bag of FIG. 41 except that the bottom side of the bag is turned.

The packaging bag of FIG. 43 is a four-sided fin seal bag. First, three sides 32 are heat-sealed, and photosensitive materials 33 are inserted into the bag through the opening. Then, the remaining side 32 is heat-sealed, and a V-shaped notch 34 is formed so as to tear in the longitudinal direction. The heat-sealed portion is made broad around the notch 34 as a reinforced part 35.

Various properties were measured as to the packaging materials of the invention IX to XI, a comparative packaging material III and conventional packaging materials IV to VII, and the results are shown in Table 3.

The packaging material of the invention IX corresponds to the packaging material of FIG. 34, and composed of the following layers.

| Biaxially stretched thermoplastic resin film layer 30: | |
| --- | --- |
| Polyester resin film | |
| Thickness; | 12 μm |
| Modified layer 31: | |
| Aluminum vacuum metallized membrane | |
| Thickness; | 400 Å |
| Adhesive layer 5: | |
| LDPE resin extrusion laminate adhesive layer | |
| Thickness; | 15 μm |
| Coextruded multilayer film layer 27a: | |
| Thickness; | 70 μm |
| Formed by inflation molding machine | |
| High density high crystallinity polyethylene resin film layer 28a: | |
| HDPE resin | 68 wt. % |
| (MI; 0.4 g/10 minutes, Density; 0.964 g/cm³) | |
| L-LDPE resin | 25 wt. % |
| (α-olefin; 4-methylpentene-1, | |
| MI; 2.1 g/10 minutes, Density; 0.920 g/cm³) | |
| LDPE resin | 4 wt. % |
| (MI; 2.4 g/10 minutes, Density; 0.923 g/cm³) | |
| Carbon black | 3 wt. % |
| Thickness; | 35 μm |
| Ethylene copolymer resin film layer 29a: | |
| L-LDPE resin | 96.9 wt. % |
| (α-olefin; 4-methylpentene-1, | |
| MI; 2.1 g/10 minutes, Density; 0.920 g/cm³) | |
| Carbon black | 3 wt. % |
| Phenol antioxidant | 0.05 wt. % |
| Oleic acid amide lubricant | 0.05 wt. % |
| Thickness; | 35 μm |

The packaging material of the invention X corresponds to the packaging material of FIG. 34, and it has the same composition as the packaging material of the invention IX except that the biaxially stretched thermoplastic resin film layer 30 is formed of a polypropylene resin film containing 0.5 wt. % of a metal salt of imidazoline type ampholytic surfactant as antistatic agent having a thickness of 20 μm, and that the modified layer 31 is a polyvinylidene chloride resin layer containing 90 wt. % of vinylidene chloride having thickness of 1 μm.

The packaging material of the invention XI corresponds to the packaging material of FIG. 35, and composed of the following layers.

| Biaxially stretched thermoplastic resin film layer 30: | |
| --- | --- |
| Polyester resin film | |
| Thickness; | 12 μm |
| Two adhesive layers 5: | |
| The same as the packaging material of the invention IX | |
| Metal foil layer 9: | |
| Aluminum foil | |
| Thickness; | 7 μm |
| High density high crystallinity polyethylene resin film layer 28a: | |
| HDPE resin | 60 wt. % |
| (MI; 1.2 g/10 minutes, Density; 0.954 g/cm³) | |
| L-LDPE resin | 36.9 wt. % |
| (α-olefin; butene-1, MI; 2.0 g/10 minutes, Density; 0.920 g/cm³) | |
| Carbon black | 3 wt. % |
| Phenol antioxidant | 0.05 wt. % |
| Oleic acid amide lubricant | 0.05 wt. % |
| Thickness; | 35 μm |
| Ethylene copolymer resin film layer 29a: | |
| The same as the packaging material of the invention IX | |

The comparative packaging material III is the laminated film composed of a bleached kraft paper layer having an areal weight of 35 g/m², an aluminum foil layer having a thickness of 7 μm and a HDPE resin inflation film layer composed of 97 wt. % of HDPE resin having a MI of 0.4 g/10 minutes and a density of 0.964 g/cm³ and 3 wt. % of carbon black having a thickness of 70 μm lamintated in this order each through a LDPE resin extrusion adhesive layer having a thickness of 15 μm.

The conventional packaging material IV is the laminated film composed of an aluminum foil layer having a thickness of 7 μm and two uniaxially stretched HDPE resin film layers composed of 95.5 wt. % of HDPE resin having a MI of 0.4 g/10 minutes and a density of 0.964 g/cm³ and 4.5 wt. % of carbon black and having a thickness of 45 μm laminated on both faces of the aluminum foil layer each through a LDPE resin extrusion adhesive layer having a thickness of 10 μm.

The conventional packaging material V is the laminated film composed of a bleached kraft paper layer having an areal weight of 35 g/m², an aluminum foil layer having a thickness of 7 μm and a L-LDPE resin film layer composed of 97 wt. % of L-LDPE resin of ethylene and 4-methylpentene-1 having a MI of 2.1 g/10 minutes and a density of 0.920 g/cm$^3$ and 3 wt. % of carbon black having a thickness of 70 μm laminated in this order each through a LDPE resin extrusion adhesive layer having a thickness of 15 μm.

The conventional packaging material VI is the laminated film composed of a bleached kraft paper layer having an areal weight of 35 g/m$^2$, and aluminum foil layer having a thickness of 7 μm and a LDPE resin film layer composed of 97 wt. % of LDPE resin having a MI of 2.4 g/10 minutes and a density of 0.923 g/cm$^3$ and 3 wt. % of carbon black having a thickness of 70 μm laminated in this order each through a LDPE resin extrusion adhesive layer having a thickness of 15 μm.

The conventional packaging material VII is the laminated film composed of a LDPE resin film layer composed of 67 wt. % of LDPE resin having a MI of 2.4 g/10 minutes and a density of 0.923 g/cm$^3$, 30 wt. % of polyisobutylene rubber and 3 wt. % of carbon black having a thickness of 50 μm, a bleached kraft paper layer having an areal weight of 35 g/m$^2$, an aluminum foil layer having a thickness of 7 μm and another LDPE resin film layer composed of 97 wt. % of LDPE resin having a MI of 2.4 g/10 minutes and a density of 0.923 g/cm$^3$ and 3 wt. % of carbon black having a thickness of 50 μm, laminated in this order each through a LDPE resin extrusion adhesive layer having a thickness of 15 μm.

The LDPE resin used in the foregoing LDPE resin extrusion adhesive layers is LDPE resin having a MI of 5.1 g/10 minutes and a density of 0.919 g/cm$^3$, and the carbon black used in the foregoing layers is oil furnace carbon black having a mean particle size of 2.1 mμ and a pH of 7.7.

The packaging bag shown in FIG. 42 was used for test.

decorated boxes were placed in a corrugated board box. The corrugated board box was vibrated by a vibrator under the conditions of JIS Z-0200, level II (vertical vibration for 30 minutes and horizontal vibration for 30 minutes), and the abrasion degree of the surface of the packaging material was observed.

Tearability:
Judged by the tearability from the notched portion by hand and the state of torn part.

Heat sealing Properties:
Judged by heat sealing strength, hot tack properties, seal ability with contrasting material, tolerance of heat sealable temperature, etc.

Breaking Strength:
1 kg of sand was put in the bag, and sealed. The bag was dropped drom 1 m height, and the breaking strength was judged by the degree of breakage of the bag.

Light-Shielding:
A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Optical Density:
The optical density of the packaging material measured by a photometer ("FSD-103" manufactured by Fuji Photo film Co., Ltd., detectable maximum optical density is 4.0.)

Moisture Permeability: JIS Z-0208

Elapsed Heat Seal Strength:
The heat seal strength of the same sample under the same heat sealing conditions was measured after 1 hour and 1 month of the heat sealing, and the elapsed heat seal strength was judged by the lowering degree and unevenness of the heat sealing strength of the sample

TABLE 3

|  | Invention | | | | | Comparative V | Conventional | |
|---|---|---|---|---|---|---|---|---|
|  | IX FIG. 34 | X FIG. 34 | XI FIG. 35 | III | IV |  | VI | VII |
| Wear Resistance | A | A | A | C | B | D | D | C |
| Tearability | A | A | A | A | E | D | D | D |
| Heat Sealing Properties | A | A | B | D-C | D-C | A | C | C |
| Breaking Strength | A | A | A | E | B | C | E-D | C-B |
| Light-Shielding | A | A | A | B | A | B | B | B |
| Optical Density | >4.0 | " | " | " | " | " | " | " |
| Moisture Permeability (g/m$^2$ 24 hrs.) | <0.6 | " | " | " | " | " | " | " |
| Elapsed Heat Seal Strength | A | A | B | D | D | A | B | B |
| Film Moldability | B | B | B | E | C | D-C | B | B |
| Folding Quality | B | B | B | B | B | D-C | C | C |
| Surface-Reverse Judgment | O | O | O | O | X | O | O | X |

Evaluation in Table 3 were carried out as follows:

| A | very excellent |
|---|---|
| B | excellent |
| C | practial |
| D | having a problem |
| E | impractical |

Testing methods were as follos:
Melt Index; ASTM D-1238
Density; ASTM D-1505
Thickness; JIS P-8118
Wear Resistance:
Products were placed in the bag, and the bag was sealed. The bag was put in a decorated box, and the after 1 month.

Film Moldability:
Each sample film was formed by an inflation film molding machine, and the film moldability was judged by bubble stability, and the generation degrees of wrinkling, furrow, lumps and melt fracture.

Folding Quality:
Each sample film molded by inflation process was cut into a square piece of 10 cm ×10 cm, and turned at a diagonal line into triangle, and the folding quality was judged the return angle immediately thereafter.

surface-Reverse Judgment:

Distinguishability of the surface and the reverse side of the packaging material under a safety light.

We claim:

1. A packaging material for photosensitive materials comprising a coextruded multilayer film layer having a Young's modulus in longitudinal direction of more than 40 kg/mm² comprising a polyolefin resin film layer having a density of 0.941 to 0.970 g/cm³, a melt index of 0.1 to 5 g/10 minutes and a Young's modulus in longitudinal direction of more than 50 kg/mm² and a ethylene copolymer resin film layer having a density of 0.870 to 0.939 g/cm³ and a melt index of 0.1 to 15 g/10 minutes, a metallized flexible sheet layer laminated on said coextruded multilayer film layer, and a flexible sheet layer laminated on said metallized flexible sheet layer, and said polyolefin resin film layer is located on the side of a packaged product.

2. The packaging material of claim 1 wherein the thickness of said coextruded multilayer film layer is 30 to 150 μm.

3. The packaging material of claim 1 wherein the thickness of said polyolefin resin film layer is 30 to 70% of the coextruded multilayer film layer and the thickness of said ethylene copolymer resin film layer is 70 to 30% of the said coextruded multilayer film layer.

4. The packaging material of claim 1 wherein said metallized flexible sheet layer is an aluminum metallized uniaxially or biaxially oriented thermoplastic resin film layer.

5. The packaging material of claim 1 wherein the heat resistances of said flexible sheet layer is higher than said polyolefin resin film layer.

6. The packaging material of claim 1 wherein said flexible sheet layer is selected from the group consisting of a white or light color, paper, synthetic paper, nonwoven fabric and molecularly oriented thermoplastic resin films.

7. The packaging material of claim 1 which contains 0.5 to 50 g/m² of light-shielding material.

8. The packaging material of claim 7 wherein the mean particle size of said light-shielding material is less than 200 mμ.

9. A packaging material comprising a coextruded multilayer film layer comprising a high density high crystallinity polyethylene resin film layer having a melt index of 0.2 to 4 g/10 minutes and a density of more than 0.941 g/cm³ and a ethylene copolymer resin film layer having a melt index of higher than said polyethylene resin film layer and a density of lower than said polyethylene resin film layer, and a biaxially stretched thermoplastic resin film layer having a thickness of 7 to 60 μm laminated on said coextruded multilayer film layer.

10. The packaging material of claim 9 wherein the resin composing said high density high crystallinity polyethylene resin film layer is a mixture of high density polyethylene resin and linear low density polyethylene resin.

11. The packaging material of claim 9 wherein the resin composing said ethylene copolymer resin film layer is linear low density polyethylene resin.

12. The packaging material of claim 9 wherein the resin composing said biaxially stretched thermoplastic resin film layer is selected from the group consisting of polyester resin, polyamide resin, polyethylene resin, polystyrene resin, polypropylene resin, polyvinyl chloride resin, polyvinylidene chloride resin, polyvinyl alcohol resin, binary and more copolymer resins of a monomer of the above resins and other monomers being random and block and blended resins of the above resins and other resins.

13. The packaging material of claim 9 which contain 0.5 to 50 g/m³ of a light-shielding material.

* * * * *

UNITED STATES PATENT AND TRADEMARK OFFICE
CERTIFICATE OF CORRECTION

PATENT NO. : 5,110,643
DATED : May 5, 1992
INVENTOR(S) : Mutsuo AKAO et al

It is certified that error appears in the above-identified patent and that said Letters Patent is hereby corrected as shown below:

On the Title page, after item [22], please insert:

--Related U.S. Application Data

[62]  Divisional of Ser. No. 147,318, Jan. 22, 1988.

[30]  Foreign Application Priority Data

Jan. 23, 1987 [JP]  Japan.............. 62-013399

Jan. 26, 1987 [JP]  Japan.............. 62-15765

Mar. 11, 1987 [JP]  Japan.............. 62-34509 [U] --

Signed and Sealed this

Twentieth Day of July, 1993

Attest:

MICHAEL K. KIRK

Attesting Officer     Acting Commissioner of Patents and Trademarks